United States Patent [19]

Moriwaki et al.

[11] 4,441,026
[45] Apr. 3, 1984

[54] CONCENTRICITY EVALUATING SYSTEM

[75] Inventors: Yoshinaga Moriwaki; Masaki Horike, both of Yokohama; Masashi Kamiya, Tokyo, all of Japan

[73] Assignee: Tokyo Shibaura Denki Kabushiki Kaisha, Kawasaki, Japan

[21] Appl. No.: 315,731

[22] Filed: Oct. 28, 1981

[30] Foreign Application Priority Data

Oct. 30, 1980 [JP] Japan ............................ 55-154178[U]

[51] Int. Cl.$^3$ ........................................... G01N 21/86
[52] U.S. Cl. ................................... 250/561; 250/560; 356/376
[58] Field of Search ................ 250/560, 561; 356/375, 356/376, 378, 385, 386

[56] References Cited

U.S. PATENT DOCUMENTS 4,196,523 4/1980 Nagata et al. .................... 33/185 R Primary Examiner—David C. Nelms
Assistant Examiner—J. Jon Brophy
Attorney, Agent, or Firm—Oblon, Fisher, Spivak, McClelland & Maier

[57] ABSTRACT

A concentricity evaluating system has a stage supported by a hydrostatic bearing in at least one of radial and thrust directions. The angle of rotation of the stage is detected by a rotation angle detector. On the stage a hollow cylindrical member is fixed coaxially. Onto the upper end face of the hollow cylindrical member or into the hole thereof a light beam is applied from a light emitting means, whereby a clear image of the profile of the hole is formed. The image thus formed is enlarged by an optical system. The light beam passing through the optical system reaches a photodiode array which is positioned across a part of the enlarged image. The hollow cylindrical member is rotated, and a displacement meter is detected how the circumference of the hollow cylindrical member varies as the member rotates. Data from the displacement meter, photodiode array and the rotation angle detector are fed to an interface and processed. The data thus processed are fed to a computer, which perform arithmetic operations on these data, thus evaluating the concentricity of the hollow cylindrical member.

6 Claims, 7 Drawing Figures

CONCENTRICITY EVALUATING SYSTEM

BACKGROUND OF THE INVENTION

This invention relates to a system for evaluating the concentricity of a hollow cylindrical member which is relatively microscopic and whose inner and outer diameters differ very much.

Generally an optical-fiber connector for use in an optical communication system is a hollow cylinder having an outer diameter of about 2.4 mm and an inner diameter of about 125 μm. The optical-fiber connector being so small, its concentricity is measured through a microscope in the prior art. More specifically, its end face is observed through a microscope. The enlarged image of the end face is put on cross hairs (i.e. X and Y reference lines) provided in the eye field of the microscope, thereby evaluating the concentricity of the connector.

The end of the optical-fiber is chamfered. Thus, the distance between the flat end face of the connector and the objective lens of the microscope is shorter than the distance between the objective lens and the point where the chamfering meets the outer periphery of the connector. It is therefore necessary to bring the microscope into focus twice, first for obtaining a clear image of the flat end face and then for obtaining a clear image of the circumference of the connector. This work is tiresome to the microscope operator, who evaluates the concentricity of the connector. The longer the operator works, the more tired he or she will be and the more errors he or she will make. This method therefore fails to evaluate the concentricity of the optical-fiber connector with a sufficient accuracy.

SUMMARY OF THE INVENTION

An object of the present invention is to provide a concentricity evaluating system wherein the coordinates of a centering point with a reference centering point in the same plane being used as origin are computed based on both the inner diameter and outer diameter of a hollow cylindrical member and which achieve an accurate evaluation of the concentricity of the member in a short time in accordance with the results of computation.

To achieve the above-mentioned object, a concentricity evaluating system of the invention comprises:

a stage which is supported by a hydrostatic bearing in at least one of radial and thrust directions;

means for detecting the angle of rotation of said stage;

fixing means for fixing a hollow cylindrical member on said stage, with the hole of the hollow cylindrical member coaxially aligned with said table;

light emitting means for emitting a light beam onto the upper end face of said hollow cylindrical member or into the hole thereof, thereby clearly indicating the profile of the hole;

optical means for enlarging the image of the profile of said hole;

light receiving means arranged at a predetermined position for receiving a part of the enlarged image transmitted from said optical means;

measuring means for electrically measuring the displacement of the circumference of the hollow cylindrical member while the member is rotating;

interface means for processing output data from said displacement meter, said light receiving means and said rotation angle detecting means; and control means for receiving output data from said interface means and for effecting arithmetic operation on the data.

This invention is directed to measuring a possible axial runout occurring between the center of the inner diameter and the center of the outer diameter of the cylindrical member, and the rotation center of the rotating stage which rotates the cylindrical member such that with the circumference divided into equal parts, measuring is performed at the divided points. Therefore, highly accurate measuring can be achieved compared to the measuring accomplished by prior art. Further, the visual checking is unnecessary, unlike in the prior art. Thus, an effective measuring can be achieved with minimum error without much manual operation except for placing the cylindrical member. Especially the measuring accuracy of the coordinates position can be highly increased since the center coordinates of the inner and the outer diameters of the cylindrical member are measured at same time and in same phase.

BRIEF DESCRIPTION OF THE DRAWINGS

Other objects and features of the present invention will be apparent from the following description taken in connection with the accompanying drawings, in which.

DETAILED DESCRIPTION OF THE PREFERRED EMBODIMENT

Figure 1:
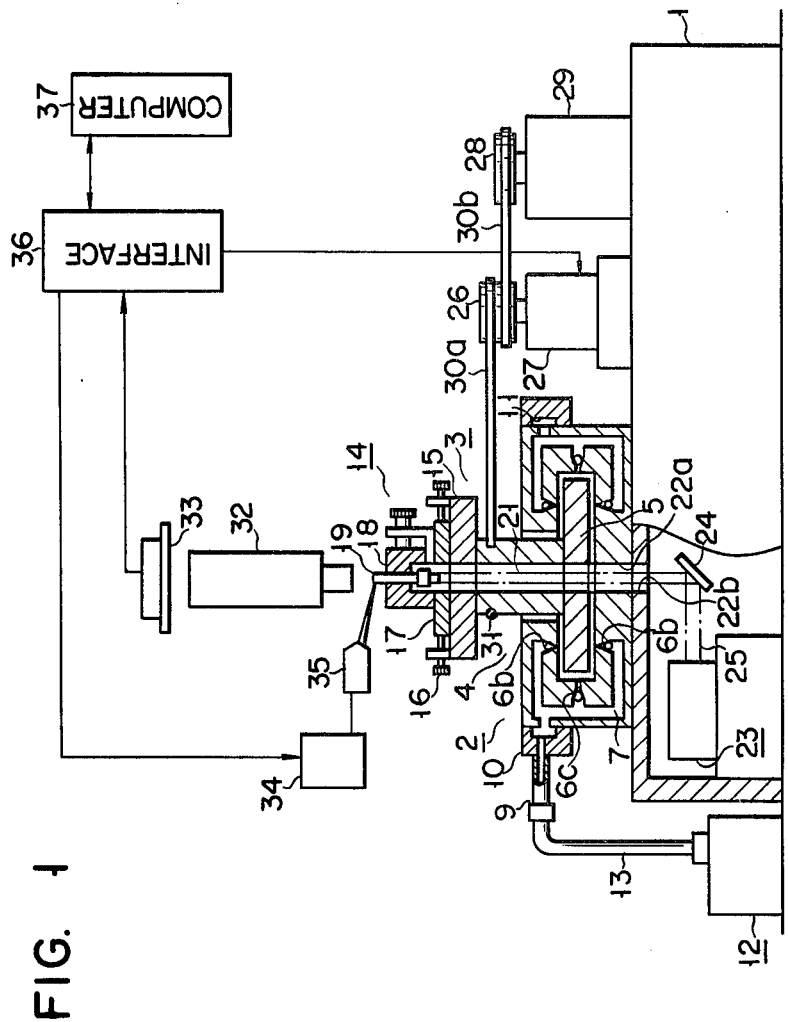
FIG. 1 is a block diagram including a partially notched part and showing one embodiment of the present invention.

In FIG. 1 a rotating stage 3 supported by a hydrostatic air bearing 2 is placed on a base 1. The hydrostatic bearing 2 surrounds a disc 5 with a narrow gap, which is formed on the lower end of a rotation shaft 4 of the rotating stage 3. A plurality of nozzles 6a, 6b and 6c are arranged inside of the hydrostatic air bearing 2 with equal angles each other, so as to inject high-pressure fluid on the upper surface, the lower surface, and on the other side of the disc 5.

Figure 2:
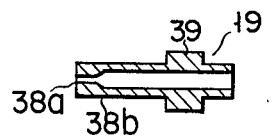
FIG. 2 is a longitudinal section of a cylindrical member.

A set of nozzles 6a, 6b and 6c are branched by flow path 7 provided in the hydrostatic air bearing 2. A fluid-supplying ring 10 with a fluid-supplying aperture 9 is attached to the hydrostatic air bearing 2. The inner wall of the fluid-supplying ring 10 has a ring-shaped slot 11, which communicates with the flow path 7. A known pressure pump 12 is connected through a feeding pipe 13 to the fluid-supplying aperture 9. To the upper end portion of the rotation shaft 4 a sample table 14 is rotatably attached. The table 14 comprises a pedestal 15, a traveling table 17 and a fixing table 18. The traveling table 17 has an adjusting mechanism 16 which quivers back and forth, left to right in a perpendicular direction to the rotation of the rotating stage 3 placed on the pedestal 15. The fixing tool 18 includes staggered space for fixing a hollow cylindrical member 19 shown in FIG. 2. A channel 21 communicating with the space is coaxially with the axis of the rotating stage 3. Further, the hydrostatic air bearing 2 and the base 1 have holes 22a, 22b communicating with the channel 21. Within the base 1 received are a light source 23 such as a laser device for emitting a parallel light beam and a reflecting mirror 24 for directing light beam emitted from the light source 23 to an inner hole of a cylindrical member 19. Further, a rotation angle detector 27 provided with a two-throw pulley 26 and a motor 29 provided with a single-throw pulley are arranged on the base 1. The rotation angle detector 27 and the motor 29 are linked by belts 30a and 30b with the slot section 31 of the rotating shaft 4.

On the other hand, a microscope 32 is positioned with its objective side facing the sample table 14 and its optical axis being approximately coaxial with the rotating stage 3. Further, on the upper side of the microscope 32 located are a photodiode array 33 for receiving an enlarged light image transmitted through the microscope 32. Further, a displacement meter 35 provided with an amplifier 34 is located near upper surface of the fixing tool 18. The meter 35 may either an electric micrometer or a capacitance-operated displacement meter. An interface 36 is connected to the rotation angle detector 27, the photodiode array 33 and the displacement meter 35. It processes data from the detector 27, the array 33 and the meter 35. To the interface 36 connected is a computer 37 for effecting an arithmetical operation on the data from the interface 36. The hollow cylindrical member 19 is, for example, an optical-communication connector which has an outer diameter of about 2.5 mm and an inner diameter of about 125 μm and has connection 39 formed in a part of the outer edge.

Figure 4:
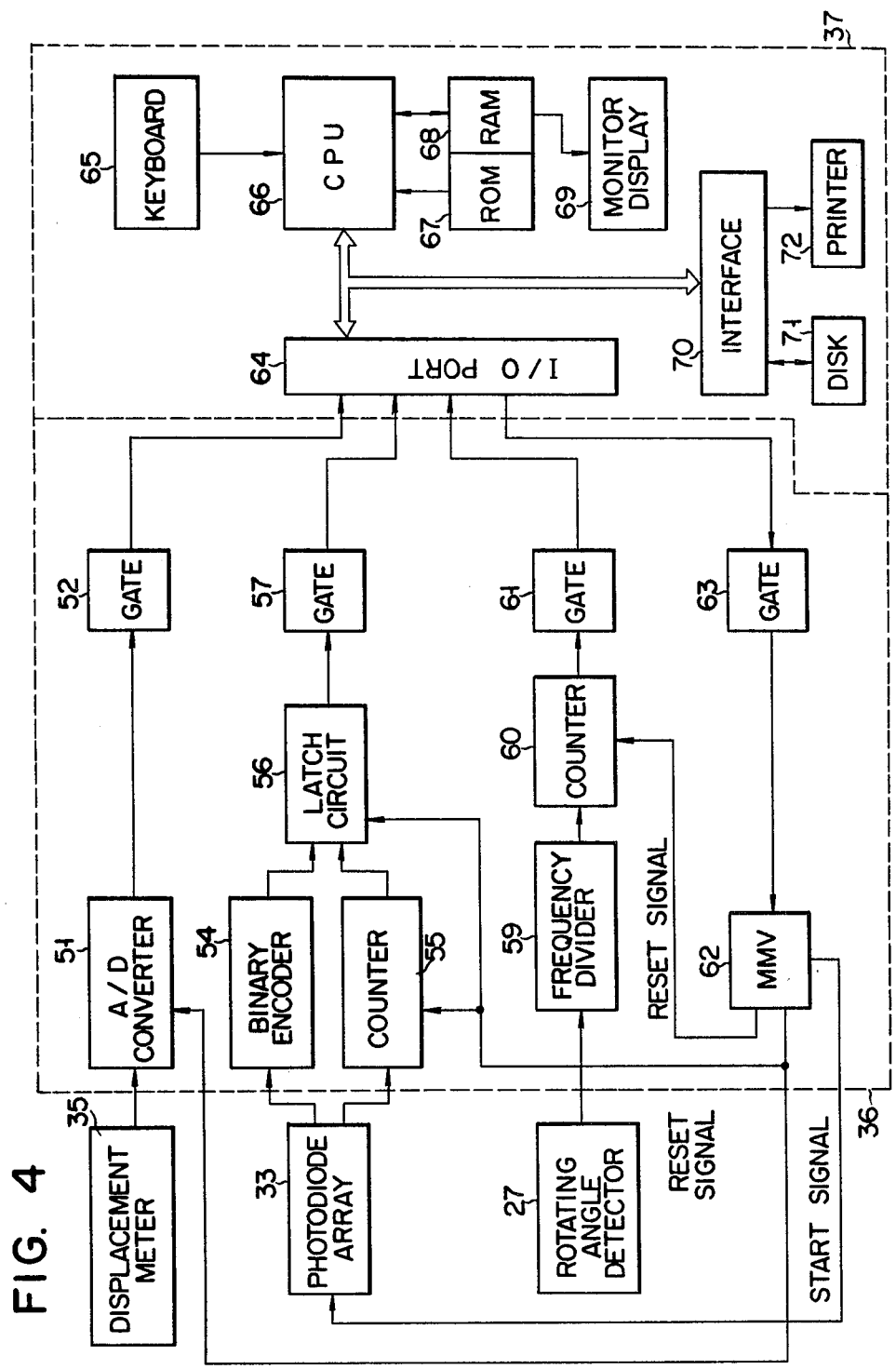
FIG. 4 is a detailed block diagram showing the interface and the computer in FIG. 1.

FIG. 4 is a detailed block diagram showing the interface 36 and the computer 37 in FIG. 1. In this embodiment, the computer 37 includes an 8-bit central processing unit 66 (hereinafter referred to as CPU), a read only memory (ROM) 67 for storing a control program; a random access memory (RAM) 68 used for the read and the write operations of data, a keyboard 65 connected to the CPU 66 for inputting a control information to the CPU 66, and a monitor display 69 connected to the RAM 68 for displaying data read out of the RAM 68. The computer 37 includes a disc 71 for storing application programs and a printer 72 for printing data fed from the CPU 66. The disc 71 and the printer 72 are connected through an interface 70 to the CPU 66. Also an I/O port 64 is connected to both the CPU 66 and the interface 70 to send and receive data from or to the CPU 64.

The interface 36 includes an analog-to-digital converter 51 (hereinafter referred to as A/D converter). Whenever the displacement meter 35 contacts the rotating connector 19, it produces reading showing the displacement of the outer diameter of the connector 19. The A/D converter 51 converts analog data from the displacement meter 35 into digital form. The output from the A/D converter 51 is fed to the CPU 66 through a gate 52, and the I/O port 64. The photodiode array 33 measures the displacement of the inner diameter of the connector 19. That is, the array 33 receives light beam through the microscope 32 and produces clock pulses corresponding to the number of photodiodes from the first which receives strong beam to the one which receives weak beam. The clock pulses are fed to the counter 55 while the VIDEO OUT signal from the aray 33 is fed to a binary encoder 54. The binary encoder 54 produces a step signal. The contents of the counter 55 is kept fed to the latch circuit 56 as long as the output from the binary encoder 54 is at high level. When the low level signal from the binary encoder 54 is fed to the latch circuit 56, the signal from the circuit 56 is transferred to the CPU 66 through a gate 57 and the I/O port 64. The rotating angle detector 27 measures the rotating angles of the connector 19 and produces 1,800 pulses for one rotation. The frequency divider 59 frequency-divides the output pulses by 10. Therefore the frequency divider 59 produces one pulse for two degrees. The output from the frequency divider 59 is transferred to the counter 60. When the counter 60 counts 180 pulses, the output thereof is transferred to the CPU 66 through a gate 61 and an I/O port 64. The CPU 66 receives the output from the counter 60 and produces a reset signal, which is fed to the counter 10, the counter 55, the latch circuit 56 and the A/D converter 51.

Figure 5:
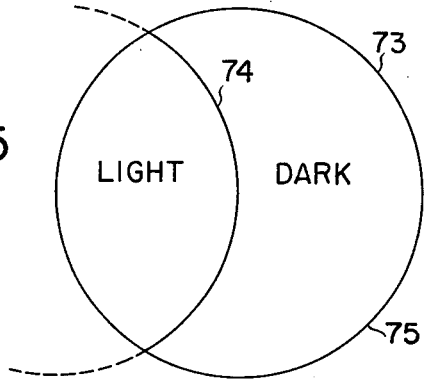
FIG. 5 illustrates how to measure the inner diameter of the optical connector.
Figure 6:
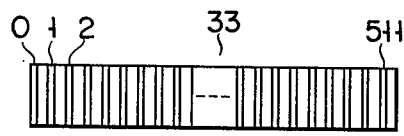
FIG. 6 is a view of a photodiode array used for measuring the inner diameter of the connector.

FIG. 5 illustrates how to measure the inner diameter of the optical connector. The reference numeral 73 denotes the observation view of the microscope 32, and the reference numeral 74 a part of the inner diameter of the connector 19. When a light beam from a light source 23 enters the hole of the connector 19, the light beam passes through the hole and reaches to the photodiode array 33. Therefore, the array receives strong light beam as shown in FIG. 6. On the other hand, when the light beam emits to the edge of the connector, i.e. region denoted by reference numeral 75, the light beam does not penetrate. Therefore, the array 33 receives weak light beam. With the system described above, evaluation of the relative concentricity between the outer diameter section 38b and the inner diameter section 38a of the cylindrical member 19 is carried out in the following manner.

Figure 3:
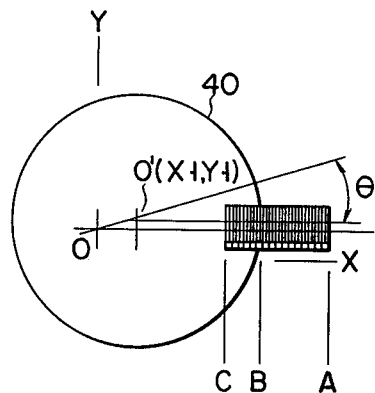
FIG. 3 illustrates how to measure the center-coordinate position of the cylindrical member in FIG. 1.

First, the cylindrical member 19 is fixed to the fixing tool 18 such that the inner diameter portion 38 of the member 19 is directed to the microscope 32 and is coaxial with the axis of the rotating stage 3. Thus, the motor 29 is driven to rotate the rotating stage 3 supported by the hydrostatic air bearing 2 with the light source 23 on. The light beam 25 introduced in the channel 21 penetrates from the bottom of the cylindrical member 19, passes through the inner diameter section 38a. As a result, a light beam having the amount corresponding to the inner diameter section 38a enters the microscope 32. The light beam is enlarged by the microscope 32 to become an enlarged image 40 as shown in FIG. 3 and is received by a part of the photodiode array 33. Since the enlarged image 40 is rotated in synchronism with the rotation of the rotating stage 3, the non-light received part A-B of the photodiode array 33 relatively changes when the rotation center (o) of the rotating stage 3 does not coincide with the center (o') of the enlarged image 40. The photodiode array 33, in this embodiment, comprises photoelectric elements having the width of 10 μm spaced with a 20 μm pitch. Each of the photoelectric elements produces an one pulse respectively. By detecting the number of the pulses N of the altered part A-B (or non-altered part B-C) of the photodiode array 33 for each rotation angle $\theta$, the coordinates (X1, Y1) of the center (o') of the enlarged image (40) can be computed by the following equations (I) and (II) in relation to the rotation center (O) as a reference point.

$$X1 = \frac{2}{n} \sum_{i=0}^{n-1} \frac{aN}{M} \cos(i\theta) \qquad (I)$$

$$Y1 = \frac{2}{n} \sum_{i=0}^{n-1} \frac{aN}{M} \sin(i\theta) \qquad (II)$$

where a=a pitch of the photoelectric element and M=a scale factor of the microscope 32.

Also, the detection of the center coordinates (X2, Y2) (not shown) of the outer diameter section (38b) of the cylindrical member 19 can be performed by the displacement meter 35 in synchronism with the coordinates detection of the center (O') in relation to the rotation center (O). The center coordinates (X2, Y2) can be computed by the following equations (III) and (IV).

$$X2 = \frac{2}{n} \sum_{i=0}^{n-1} bk \cos(i\theta) \qquad (III)$$

$$Y2 = \frac{2}{n} \sum_{i=0}^{n-1} bk \sin(i\theta) \qquad (IV)$$

where b=minimum resolution in analog-to-digital conversion of the output voltage of the displacement meter 35, for example, when an analog-to-digital converter which converts 10 mV to 1 bit is connected to the displacement meter 35 which receives the displacement amount of 10 μm and produces 1 V, the minimum resolution is 10(μm/V)×10(mV/bit)=0.1 μm/bit and K=the number of bits after the analog-to-digital conversion.

The measurement with the photodiode array 33 and the displacement meter 35 is preferably effected in phase. And phase detection is required when measured in out of phase.

For the computation based on the above equations (I) through (IV), the signals from the rotation angle detector (27), the photodiode array (33) and the displacement meter (35) are fed to the interface (36) and converted to digital signals. The digital signals are input to the computer to effect an arithmetical operation in accordance with the above described equations (I) through (IV). Further, the distance between (X1, Y1) and (X2, Y2), which is inversely proportional to the concentricity of the inner diameter section (38a) in relation to the outer diameter section (38b), can be computed by the computer through the arithmetic operation $\sqrt{(X1-X2)^2+(Y1-Y2)^2}$.

Figure 7:
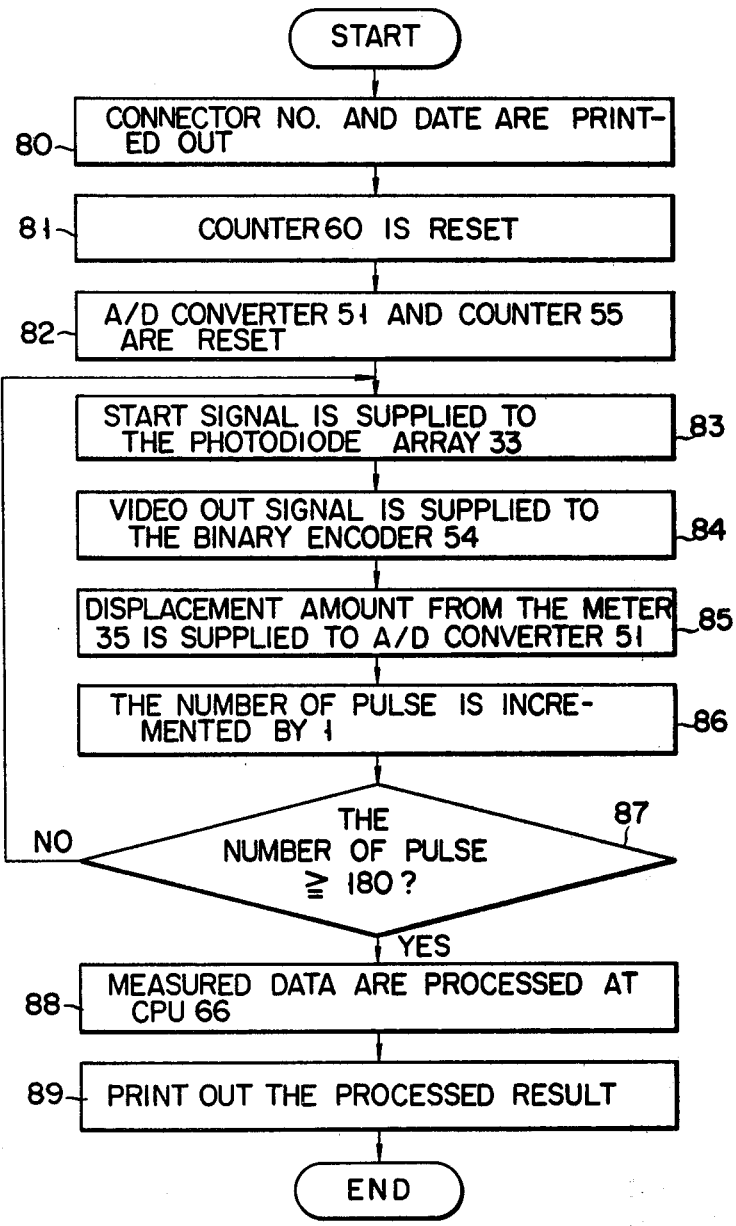
FIG. 7 is a flow chart showing the measurement operation of the embodiment in FIG. 1.

FIG. 7 is a flow chart showing the measurement operation of the embodiment in FIG. 1. First, a connector number to be tested and testing date and so on are print out in step 80. In step 81, the CPU 66 produces a reset signal through the I/O port 64, gate 63 and monostable multivibrator 62 to the A/D converter 51, the counter 55, the latch circuit 56 and the counter 60 are reset. In step 83, a start signal is supplied to the photodiode array 33. The photodiode array receives the light beam reflected from the connector 19. The array receives weak light beam from part of the hole of the connector 19 and receives strong light beam from part of edge of the connector 19. Then the photodiode array 33 produces a VIDEO OUT signal to be supplied to the binary encoder 54 in step 84. The binary encoder 54 produces an output signal when the VIDEO OUT signal reaches to a predetermined level. On the other hand, the photodiode array 33 produces a clock signal to be supplied to the counter 55. The output from the counter 55 is supplied to the latch circuit 56 till the latch circuit 56 receives the output from the binary encoder 54. The output from the latch circuit 56 is transferred through the gate 57 and the I/O port 64 to the CPU 66. In step 85 the displacement amount from the displacement meter 35 is supplied to the A/D converter 51. The A/D converter 51 converts the analog input signal into digital form. Then the output signal from the A/D converter 51 is fed through the gate 52 and the I/0 port 64 to the CPU 66.

On the other hand, the rotating angle detector 27 produces 1,800 pulses for the one rotation of the rotating stage 3. Those pulses are fed to the frequency divider 59 to be divided by 10. Therefore the frequency divider 59 produces an one pulse for each two degrees of the rotating angle. The output from the frequency divider 59 is supplied to the counter 60, where the number of the pulse is incremented by 1 as shown in step 86. The output from the counter 60 is transferred through the gate 61 and the I/O port 64 to the CPU 66. The CPU 66 judges whether the contents of the counter 60 is 180 or more. If the contents of the counter 60 is less than 180, the control is returned to step 83 and the steps 83 through 86 are repeated. While if the contents of the counter 60 is 180 or more, the CPU 66, in step 88, computes the center coordinates (X1, Y1) of the center (O') of the enlarged image 40 and the coordinates (X2, Y2) of the outer diameter 38b of the connector 19 in accordance with the equations (I) through (IV). The computing results are printed out by the printer in step 89. In the embodiment above described, the inner diameter section of the cylindrical member is illuminated to obtain an image of the profile of the inner diameter section 38a of the cylindrical member 19. The means for introducing the light, however, is not limited to the above embodiment. An optical fiber can be used for that purpose.

On the contrary, the light can be emitted to the surroundings of the inner diameter section 38a from the microscope 32 via a half opaque mirror utilizing an optical reflection of the upper surface of the cylindrical member 19 so that a reverse light beam (ring-shaped beam) in relation to that of the above described embodiment can be received by the photodiode array 33.

The preferred embodiment of the concentricity evaluating system has been described as an example of the invention as claimed. However, the present invention should not be limited to the details illustrated in the accompanying drawing and the specification, since this invention may be practiced or constructed in a variety of different embodiments. Also, it must be understood that the terminology and descriptions employed herein are used solely for the purpose of describing the general operation of the preferred embodiment and therefore should not be construed as limitations on the operability of the invention.

What we claim is:

1. A concentricity evaluating system comprising:
   a stage which is supported by a hydrostatic bearing in at least one of radial and thrust directions;
   means for detecting the angle of rotation of said stage;
   fixing means for fixing a hollow cylindrical member on said stage, which the hole of the hollow cylindrical member coaxially aligned with said stage;
   light emitting means for emitting a light beam onto the end face of said hollow cylindrical member or into the hole thereof, thereby clearly indicating the profile of the hole;

optical means for enlarging the image of the profile of said hole;

light receiving means arranged at a predetermined position for receiving a part of the enlarged image transmitted from said optical means;

measuring means for electrically measuring the displacement of the circumference of the hollow cylindrical member while the member is rotating;

interface means for processing output data from said displacement meter, said light receiving means and said rotation angle detecting means; and control means for receiving output data from said interface means and for detecting an arithmetic operation on the data.

2. A concentricity evaluating system according to claim 1, wherein said control means has a microprocessor connected to said measuring means, said light receiving means, and said rotation angle detecting means, and which includes a central processing unit for receiving data representing the angle of rotation of said stage, the center coordinates of outer diameter of the hollow cylindrical member and the center of the inner diameter thereof, a read only memory device for storing permanent programs, said read only memory device storing the permanent programs having functions of said central processing unit so that said control device may perform specific functions according to the permanent programs; wherein said rotating angle detecting means, said light receiving means, and said measuring means are so controlled as to produce an output signal representing the angle of rotation of said stage, an output signal representing the center coordinates of the inner diameter of said hollow cylindrical member and an output signal representing the center coordinates of the outer diameter of said hollow cylindrical member, respectively.

3. A concentricity evaluating system according to claim 2 wherein the center coordinates (X1, Y1) of the inner diameter of the hollow cylindrical member is computed by the following equations:

$$X1 = \frac{2}{n} \sum_{i=0}^{n-1} \frac{aN}{M} \cos(i\theta)$$

$$Y1 = \frac{2}{n} \sum_{i=0}^{n-1} \frac{aN}{M} \sin(i\theta)$$

where
a = a pitch of the photoelectric element,
M = scale factor of the microscope,
N = number of pulses,
$\theta$ = rotating angle of the rotating stage, and
n = number of photodiodes and the center coordinates (X2, Y2) of the outer diameter of the hollow cylindrical member is computed by the following equations:

$$X2 = \frac{2}{n} \sum_{i=0}^{n-1} bk \cos(i\theta)$$

$$Y2 = \frac{2}{n} \sum_{i=0}^{n-1} bk \sin(i\theta)$$

where
b = minimum resolution in analog-to-digital conversion of the output voltage of the displacement measuring means,
k = the number of bits after the analog-to-digital conversion,
n = the number of photodiodes, and
$\theta$ = the rotating angle of the rotating stage.

4. A concentricity evaluating system according to claim 1 wherein said interface means includes:

an A/D converter connected to said displacement measuring means for receiving data representing a displacement of the outer diameter of the hollow cylindrical member and for converting the data into digital form to be supplied to said control means;

a binary encoder connected to said light receiving means for receiving data representing the displacement of the inner diameter of the hollow cylindrical member from the light receiving means and for producing binary data;

a first counter connected to said light receiving means for counting for a predetermined time the clock pulses from said light receiving means;

a latch circuit connected to said binary encoder and said first counter for latching the output from said first counter in accordance with the output from the binary encoder and for transferring the latched data to the control means;

a frequency divider connected to said rotating angle detecting means for frequency-dividing the rotating angle output from the rotating angle detecting means;

a second counter connected to said frequency divider for counting the outputs from the frequency divider until the rotating stage performs one rotation and for transferring the contents of the counter to the control means;

a monostable multivibrator connected to said analog-to-digital converter, said first and second counters and said latch circuit to supply a reset signal and connected to said light receiving means to supply a start signal.

5. A concentricity evaluating system according to claim 1 wherein said light receiving means comprises a photodiode array.

6. A concentricity evaluating system according to claim 1 wherein said displacement measuring means comprises an electric micrometer.

* * * * *